United States Patent [19]

Boecker, Jr.

[11] Patent Number: 4,706,437
[45] Date of Patent: Nov. 17, 1987

[54] OFFSET ANCHOR

[76] Inventor: George C. Boecker, Jr., 3010 Lorena Ave., Baltimore, Md. 21230

[21] Appl. No.: 5,467

[22] Filed: Jan. 20, 1987

Related U.S. Application Data

[63] Continuation of Ser. No. 739,922, May 31, 1985, abandoned.

[51] Int. Cl.$^4$ ........................ E04B 1/38; F21D 20/00; F16B 13/04
[52] U.S. Cl. ......................... 52/698; 52/704; 405/259; 411/75; 411/78; 411/79; 411/80
[58] Field of Search ................. 52/698, 704; 405/259; 411/79, 80, 55, 75, 78, 63

[56] References Cited

U.S. PATENT DOCUMENTS

| | | | |
|---|---|---|---|
| 737,555 | 8/1903 | Dorn | 411/79 |
| 922,980 | 5/1909 | Vernon et al. | 405/259 |
| 2,706,499 | 4/1955 | Grable | 411/79 X |
| 3,478,641 | 11/1969 | Dohmeier | 411/79 |

FOREIGN PATENT DOCUMENTS

| | | | |
|---|---|---|---|
| 920781 | 11/1954 | Fed. Rep. of Germany | 405/259 |
| 3377 | of 1915 | United Kingdom | 411/80 |
| 780217 | 7/1957 | United Kingdom | 405/259 |

Primary Examiner—Alfred C. Perham
Attorney, Agent, or Firm—Walter G. Finch

[57] ABSTRACT

The invention is an improved anchor for machine bolts and other similar fastening devices in masonry or other materials. The improved anchor consists primarily of a two-piece body structure. When in use the two-piece body structure is arranged for receiving a fastening device, such as a machine bolt or other similar fastener. The two-piece body structure is cylindrical on the exterior thereof with the offset between the first and second of the two pieces of the body structure being a cut or separation through the body structure at an angle to the longitudinal centerline of the two-piece body structure. Each of the two pieces of the two-piece body structure has a plurality of saw tooth-like cuts or serrations on a portion of the exterior surface. The saw tooth-like cuts on the first piece of the two-piece body structure being located 180° from the saw tooth-like cuts on the second piece. The first piece, which is the bottom portion of the two-piece anchor, is threaded to receive a threaded fastening device; the second piece, which is the top portion of the two-piece anchor, has an elongated passage way therethrough to allow movement of the second piece when the threaded fastening device is screwed into and tightened in the threaded portion of the first piece. The tightening causes the two pieces to slide in opposite directions on the angled offset surface so that the saw tooth-like cuts bite or grip into the sides of the hole in the masonry or other material of the structure in which the improved anchor has been inserted. The improved anchor is easily removed by loosening the fastening device and tapping it.

3 Claims, 5 Drawing Figures

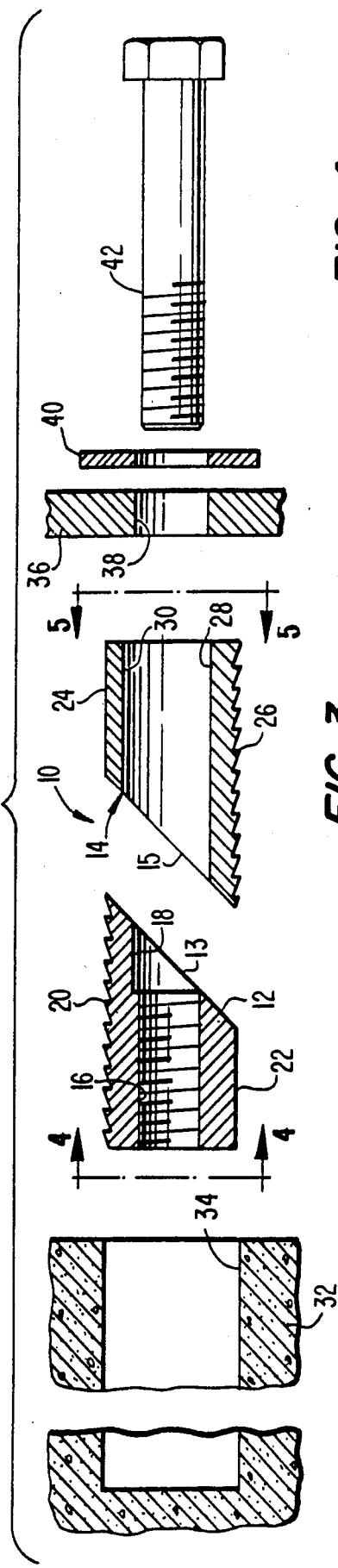
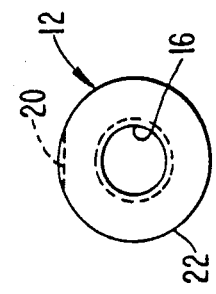
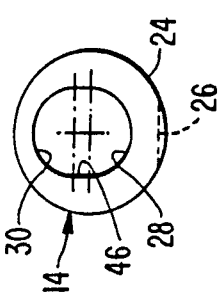
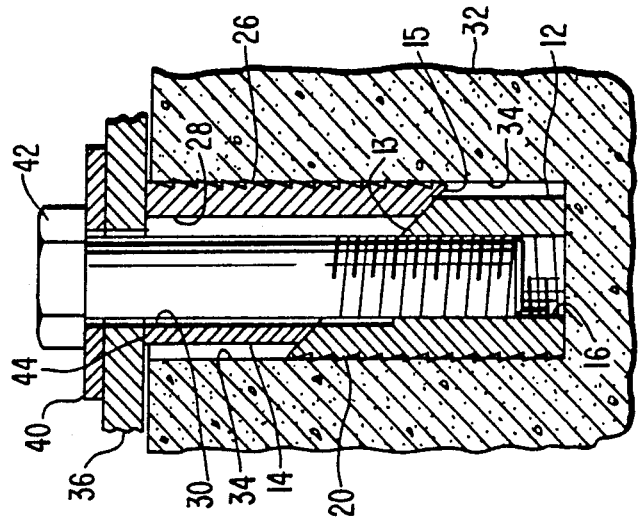
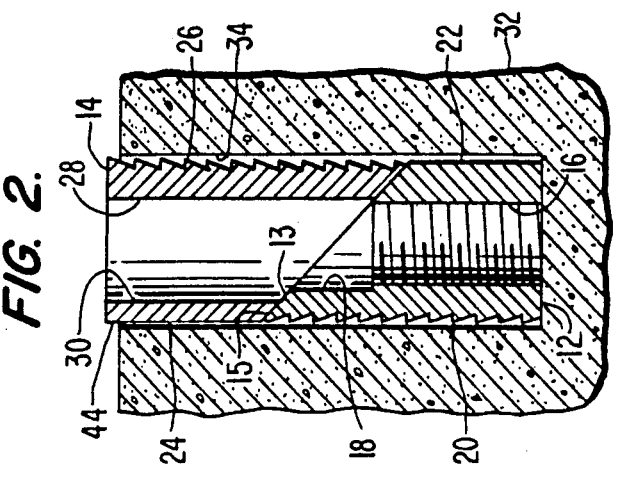

OFFSET ANCHOR

This patent application is a continuation of my U.S. patent application Ser. No. 739,922 filed May 31, 1985 for "Offset Anchor" now abandoned.

BACKGROUND AND SUMMARY OF THE INVENTION

This invention relates to construction and erection procedures, methods, and materials, and particularly to fastening devices. Specifically, it relates to fasteners such as anchor-type devices for use in masonry and other similar materials.

The present invention of an improved anchor means is simple to install, provides a fine grip for fastening by anchoring, and can be removed easily for economical reuse.

In the prior art the anchor devices are usually of soft metals which distort when forced into a hole in masonry or other materials and are destroyed in their use, being of a single use only and normally not recoverable for economical reuse. Other prior art types lock into a hole by penetration and distortion of the opposite side of the surface to which an item is to be anchored, thereby being destroyed in the use and unrecoverable, some prior art hard metal types are distorted in place by a setting tool, thereby destroying the possibility for reuse.

The present invention of an improved anchor means consists primarily of a two-piece body structure. When in use the two-piece body structure is arrange for receiving a fastening device, such as a machine bolt or other similar fastener device, such as machine bolt or other similar fastener.

The two-piece body structure is cylindrical on the exterior thereof with offset between the first and second pieces of the two pieces of the two-piece body structure being a cut or a separation through the body structure at an angle to the longitudinal centerline of the two-piece body structure.

Each of the two pieces of the two-piece body structure has a plurality of saw tooth-like cuts or serrations on a portion of the exterior surface. The saw tooth-like cuts or serrations on the first piece of the two-piece body structure being located 180° around the cylindrical body from the saw tooth-like cuts on the second piece.

The first piece, which is the bottom portion of the two-piece anchor, has been threaded internally to receive a threaded fastening device. The second piece, which is the top portion of the two-piece anchor, has an elongated passageway longitudinally therethrough. The elongated passageway in the second piece, or top portion, is generally in line with the internal threaded portion of the first piece, or bottom portion. Thus, the elongated passageway and the internally threaded portion in general communicate with each other to provide a longitudinal passageway through the entire two-piece body structure.

The elongated passageway allows lateral movement of the second piece, or top portion, when the threaded fastening device is screwed into and tightened in the threaded portion of the first piece. The threaded fastening device, which fastens a structural member or a piece of equipment or other similar facility to the improved anchor, is inserted through a member of the facility being secured to the anchor, then through the elongated passageway in the second piece of the two-piece body structure, and then screwed into the internal thread in the first piece of the two-piece body structure; the top and bottom portions of the two-piece improved anchor having been first placed in a prepared hole in the masonry or other structural facility to which a structural member or piece of equipment is to be secured.

As the threaded fastening device is tightened in the internal thread in the first piece, or bottom portion of the two-piece improved anchor, the second piece or top portion of the two-piece improved anchor slides along the angle cut or separation between the first and second pieces of the anchor and the lateral movement forces the saw tooth-like cuts or serrations of each of the two pieces to bite or grip into the internal surface of the hole in which the improved anchor has been placed. Thus, the improved anchor is locked or fixed into position, the elongated passageway in the top portion of the anchor having allowed the lateral movement to take place by providing clearance for the top portion to move laterally without binding on the fastener device such as a machine bolt.

When the anchored structure is disassembled or the piece of equipment is removed, the fastening device is loosened in the anchor and tapped with a hammer for easy removal and recovery of the improved anchor for economical reuse.

It is, therefore, an object of this invention to provide an improved anchor for use in masonry or other structural materials.

It is also an object of this invention to provide an improved anchor that is simple to install in masonry or other structural materials.

It is another object of this invention to provide an improved anchor that is easily removable for economic reuse.

It is still another object of this invention to provide an improved anchor that is not distorted, damaged, or destroyed, in use so that it can be reused.

It is yet another object of this invention to provide an improved anchor that uses an angular offset and saw tooth-like serrations to achieve the anchoring potential of the device.

Other advantages of the present invention will become obvious with the following description of the invention.

BRIEF DESCRIPTION OF THE DRAWINGS

FIG. 1 is an exploded longitudinal cross-sectional view of an offset anchor;

FIG. 2 is a longitudinal cross-sectional view of an offset anchor shown in place before use;

FIG. 3 is a longitudinal cross-sectional view of an offset anchor shown in place when in use;

FIG. 4 is an end view of FIG. 1 from line 4—4; and

FIG. 5 is an end view of FIG. 1 from line 5—5.

DESCRIPTION OF THE PREFERRED EMBODIMENTS

Turning now to the drawings, and particularly FIGS. 1, 2, and 3, an offset anchor is shown at 10.

FIG. 1 shows the offset anchor 10 in an exploded longitudinal cross-sectional view in relation to the masonry or similar structural material in which it is to serve as an anchor, and also in relation to the item to be anchored and the fastener means.

FIG. 2 shows the offset anchor 10 in a longitudinal cross-sectional view in position within a prepared cavity in masonry or other similar structural material in which it is to serve as an anchor, and in a position ready for use.

FIG. 3 shows the offset anchor 10 in a longitudinal cross-sectional view in place and in use.

Detailed descriptions of the elements and components of the offset anchor 10 are provided hereinafter, including the details of the material in which the offset anchor 10 will be anchored and the item which will be anchored by the offset anchor 10.

The two-piece offset anchor 10 consists of two components, a first piece or bottom portion 12 and a second piece or top portion 14. When in use the first and second pieces 12 and 14 respectively interface on an angular truncated face cut through and between the first and second pieces 12 and 14, which provides an angular truncated face 13 on the first piece 12 which mates with and interfaces with an angular truncated face 15 on the second piece 14, when assembled for and in use. The ends opposite the angular truncated faces 13 and 15 are at right angles to the cylindrical configuration of the two components.

The first piece or bottom portion 12 is cylindrical in general configuration with a threaded passageway 16 centrally located therein. A counter-bore 18 is concentrically located above the centrally located threaded passageway 16 in the first piece or bottom portion 12. The counter-bore 18 extends from the uppermost end of the threaded passageway 16 through the angular offset face 13 of the first piece or bottom portion 12. A plurality of saw tooth-like cuts or serrations 20 is provided on one "side" of the cylindrical body 22. These saw tooth-like cuts or serrations 20 can be seen in FIGS. 1 and 4 as to their location on the so-called one "side" of the cylindrical body 22.

The saw tooth-like cuts or serrations 20 are made in the cylindrical body 22 of the first piece or bottom portion 12 so that the external points or sharp edges of the plurality of cuts or serrations 20 are on the uppermost sides of the cuts or serrations 20. I this relationship bottommost or lowermost is meant to be that portion of the two-piece offset anchor 10 that is at or toward the bottom of the cavity 34 in the structure 32, such as masonry or other similar structural material; whereas topmost or uppermost is upward from or away from the bottom of the cavity 34 in the structure 32.

Note in FIG. 2 that when the offset anchor 10 is placed in the prepared cavity 34 in the structural material 32 that the surfaces of the cylindrical body 22 and the pointed or sharp edges of the plurality of cuts or serrations 20 are slightly clear of the prepared cavity 34. This permits easy insertion of the offset anchor 10 into the cavity 34.

As can also be seen in FIG. 2 the second piece or top portion 14, which is described in detail hereinafter in regards to FIG. 1, has a similar cylindrical body portion 24 and a plurality of cuts or serrations 26 which also slightly clear the prepared cavity 34 in a manner similar to the first piece or bottom portion 12.

The second piece or top portion 14 is cylindrical in general configuration 24 and sized similar to the first piece or bottom portion 12. The second piece or top portion 14 has a plurality of saw tooth-like cuts or serrations 26, similar to the saw tooth-like cuts or serrations 20 of the first piece or bottom portion 12. However, the saw tooth-like cuts or serrations are located on the second piece or top portion 180° around the cylindrical body 24 from the location of the saw tooth-like cuts or serrations 20. These saw tooth-like cuts or serrations 26 for the second piece or top portion 14 can be seen in FIGS. 1 and 5. The comparative location relationship of the saw tooth-like cuts or serrations 20 and 26, respectively, can best be seen in FIG. 1 where they are shown on opposite "sides" of the respective cylindrical bodies 22 and 24.

The external points or sharp edges of the plurality of cuts or serrations 26 are configured to project in a similar manner and direction as noted hereinbefore for the plurality of cuts and serrations 20.

The plurality of cuts or serrations 20 and 26, respectively, are each set in a vertical alignment with the cuts or serrations 20 and 26 respectively, being parallel with each other.

In FIG. 1 a member 36 of the structure or item to be anchored in place by the offset anchor 10 is shown in its relationship to the offset anchor 10 components and other elements of the assembly.

In FIG. 3 the fastening means 42, such as a machine bolt, is shown passed through an optional washer 40, then through an aperture 38 in the member 36 and engaged in the threaded portion 16 in the first piece or bottom portion 12 of the offset anchor 10. As the fastening means 42 is tightened in the thread portion 16, the offset face 15 of the second piece or top portion 14 slides at its interface with the offset face 13 of the first piece or bottom portion 12. As a result, the extension or projection 44 shown in FIG. 2 is reduced as the fastening means 42 is tightened and the sliding at the offset faces 15 and 13 takes place, as noted hereinbefore, and the cuts or serrations 20 and 26 dig into and grip the surfaces of the cavity 34, thereby anchoring the structure or item 36 in place by means of the offset anchor 10.

It is to be noted that the optional washer 40 provides an increased bearing and compression surface under the head of the fastening means 42, as well as slippage means if required.

When the fastening means 42 is tightened, as noted hereinbefore, and the second piece or top portion 14 begins to slip or move at the offset interface of face 15 on face 13 of the first piece or bottom portion 12, the fastening means 42 needs clearance during the sliding movement, because it is rigidly fixed in the threaded portion 16. To provide for this required clearance the second piece or top portion 14 has an elongated passageway 46 through it, which can be seen in FIG. 5. A first portion 28 of the elongated passageway 46 mates with matches, and coincides with one side of the counter-bore 18. A second portion 30 of the elongated passageway 46 is offset from the common centerline of the counter bore 18 and the first portion 28 of the elongated passageway 46. Thus, the elongated passageway 46 provides the necessary clearance for the fastening means 42 as the first and second pieces 12 and 14, respectively, slide and move to grip the surfaces of the cavity 34.

It is to be noted that the saw tooth-like cuts or serrations 20 and 26 are shown as simple straight cuts into the first and second pieces 12 and 14, but they can also be made by turning a plurality of undercuts into the two components 12 and 14. Such a variation is within the scope and intent of this invention.

For easy removal and recovery of the offset anchor 10 for economical reuse, the fastening means 42 can be loosened and tapped lightly with a tool, such as a hammer, to disengage the saw tooth-like projections 20 and 26 from the surrounding walls of the cavity 34. The offset anchor 10 can then be lifted easily from the cavity 34. The offset anchor 10 may be made of various materials, however, steel is most desirable, especially in view of the reuse capabilities.

As can be readily understood from the foregoing description of the invention, the present structure can be configured in different modes to provide the ability to anchor and object.

Accordingly, modifications and variations to which the invention is susceptible may be practiced without departing from the scope and intent of the appended claims.

What is claimed is:

1. An anchor device, comprising:

a first portion, said first portion being generally circular in cross-section, said first portion having a first end and a second end, said first end being flat and at a right angle to the sides of the first portion, said second end being angular and truncated in relation to the sides of said first portion, said first portion forming a first generally cylindrical tube having an interior and an exterior, said first portion exterior having a plurality of serrations, said plurality of serrations being on one side of the exterior of the first cylindrical tube, the tube interior having a threaded portion adjacent the first end and a counter-bore located adjacent to the second end, said threaded portion and said counter-bore communicating with each other to form a first longitudinal passageway generally concentric to the tube exterior and a second portion, said second portion being generally cylindrical in configuration, said second portion having a first end and a second end, said first end being flat and at a right angle to the sides of said generally cylindrical configuration, said second end being angular and truncated in relation to the sides of said generally cylindrical configuration, a longitudinal passageway through said second portion, with said longitudinal passage through said first portion communicating with said longitudinal passageway through said second portion, said second portion having a plurality of serrations, said plurality of serrations being on one side of said generally cylindrical configuration, said angular truncated second end of said first portion adapted to interface with said angular truncated second end of said second portion, said second portion having a longitudinal passageway havng generally smooth interior walls, the passageway being generaly oval in cross-section, the oval cross section having a long axis and a short axis, the long axis oriented perpendicular to said serrations, the centroid of the oval being displaced from the longitudinal axis of said second portion away from said serrations, and whereby, said plurality of serrations on said first portion and said second portion are arranged in vertical alignment and parallel to one another, the serrations of the first portion being located 180° around and from the serrations of the first portion, the serrations of each portion being saw tooth-like in configuration, said saw tooth-like configuration each having an external sharp point, the sharp point not exceeding and generally co-extensive with the outside diameter of its respective cylindrical configuration, said external sharp point of each saw tooth-like configuration being the uppermost side of each said saw tooth-like configuration.

2. An anchor devIce as recited in claim 1 and additionally, a suitable fastener means, said fastener means being for the purpose of affixing a selected structural member to said assembled first portion and said second portion which constitutes an anchor device, said suitable fastener means being passed through a suitable aperture in said structural member, then into and through said elongated passageway in said second portion, then into and through said counter-bore in said first portion and then into and engaging said threaded portion in said longitudinal passageway in said first portion, thereafter tightening of said fastener means to secure said anchor means in a suitable cavity of a selected structural means to which said structural member is to be affixed by said anchor device.

3. An anchor device as recited in claim 2 and additionally, a suitable washer, said suitable washer being inserted between said fastener means and said selected structural member for purposes of providing a slippage and increased compression surface between said fastener means and said selected structural member.

* * * * *